United States Patent
Qi et al.

(10) Patent No.: US 10,389,645 B2
(45) Date of Patent: Aug. 20, 2019

(54) COMMUNICATIONS NETWORK DELAY VARIATION SMOOTHING METHOD, APPARATUS, AND SYSTEM

(71) Applicant: Huawei Technologies Co., Ltd., Shenzhen (CN)

(72) Inventors: Yunlei Qi, Shenzhen (CN); Chunrong Li, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/797,831

(22) Filed: Oct. 30, 2017

(65) Prior Publication Data
US 2018/0069801 A1 Mar. 8, 2018

Related U.S. Application Data

(63) Continuation of application No. PCT/CN2015/097537, filed on Dec. 16, 2015.

(30) Foreign Application Priority Data

Apr. 30, 2015 (CN) .......................... 2015 1 0217473

(51) Int. Cl.
*H04J 3/06* (2006.01)
*H04L 12/26* (2006.01)
(Continued)

(52) U.S. Cl.
CPC ........ *H04L 47/283* (2013.01); *H04L 43/0852* (2013.01); *H04L 43/16* (2013.01);
(Continued)

(58) Field of Classification Search
CPC ...... H04J 3/0647; H04J 3/0667; H04J 3/0673; H04L 41/0896; H04L 43/0852; H04L 43/16; H04L 47/283; H04W 56/00
See application file for complete search history.

(56) References Cited

U.S. PATENT DOCUMENTS 5,838,688 A * 11/1998 Kadambi .............. H04L 12/413
370/445
6,693,921 B1 2/2004 Whitfield
(Continued)

FOREIGN PATENT DOCUMENTS

CN 101110661 A 1/2008
CN 101160900 A 4/2008
(Continued)

OTHER PUBLICATIONS

Exel, Mitigation of Asymmetric Link Delays in IEEE 1588 Clock Synchronization Systems, Mar. 2014, IEEE Communications Letters, vol. 18, No. 3 (Year: 2014).*
(Continued)

*Primary Examiner* — Eric Nowlin
(74) *Attorney, Agent, or Firm* — Leydig, Voit & Mayer, Ltd.

(57) ABSTRACT

A communications network delay variation smoothing method, an apparatus, and a system are disclosed. The method includes: clearing, by a local device, a forward delay threshold and a reverse delay threshold when an initialization time starts; and when determining that a maximum value between a real-time forward delay value corresponding to a current service flow fragment and a reverse delay threshold corresponding to the current service flow fragment is greater than a current value of the forward delay threshold, replacing the current value of the forward delay threshold with the maximum value. In this way, after the initialization ends, a delay threshold after the initialization ends is determined and is applied to delay compensation, thereby significantly reducing a bi-directional asymmetric delay variation, and avoiding a problem of abnormal user communication that is caused when the variation exceeds a limit.

15 Claims, 8 Drawing Sheets

(51) Int. Cl.
   *H04W 56/00*      (2009.01)
   *H04L 12/841*     (2013.01)
(52) U.S. Cl.
   CPC ........... *H04W 56/00* (2013.01); *H04J 3/0647*
              (2013.01); *H04J 3/0667* (2013.01); *H04J*
                                    *3/0673* (2013.01)

(56) References Cited

U.S. PATENT DOCUMENTS

| | | | |
|---|---|---|---|
| 6,718,170 B1 | 4/2004 | Hughes | |
| 6,868,094 B1* | 3/2005 | Bordonaro | H04L 41/5009 370/516 |
| 6,980,523 B1* | 12/2005 | Lipford | H04L 47/14 370/252 |
| 7,542,433 B2* | 6/2009 | Miyoshi | H04B 7/2659 370/255 |
| 7,643,430 B2* | 1/2010 | Morandin | H04J 3/0682 370/252 |
| 7,689,854 B2* | 3/2010 | Ilnicki | H04J 3/0667 370/350 |
| 7,792,083 B2* | 9/2010 | Bordonaro | H04L 41/5009 370/334 |
| 7,808,918 B2* | 10/2010 | Bugenhagen | H04L 47/22 370/229 |
| 7,860,107 B2* | 12/2010 | Legg | H04L 47/10 370/312 |
| 7,953,013 B2* | 5/2011 | Miyoshi | H04B 7/2659 370/241 |
| 8,018,972 B2* | 9/2011 | Roberts | H04J 3/0667 370/507 |
| 8,325,767 B2* | 12/2012 | Burch | H04J 3/0667 348/194 |
| 8,335,861 B2* | 12/2012 | Sun | H04J 3/0673 370/455 |
| 8,473,638 B2* | 6/2013 | Aweya | H04J 3/0667 709/203 |
| 8,718,482 B1* | 5/2014 | Roberts | H04B 10/27 398/102 |
| 8,913,632 B2* | 12/2014 | Aweya | H04J 3/0664 370/503 |
| 8,917,663 B2* | 12/2014 | Khoury | H04W 56/0035 370/252 |
| 9,094,142 B2* | 7/2015 | Ruffini | H04J 3/065 |
| 9,112,628 B2* | 8/2015 | Aweya | H04J 3/0667 |
| 9,112,630 B1* | 8/2015 | Mizrahi | H04J 3/0641 |
| 9,112,631 B2* | 8/2015 | Aweya | H04J 3/0682 |
| 9,154,259 B2* | 10/2015 | Miyoshi | H04B 7/2659 |
| 9,166,681 B2* | 10/2015 | Cavaliere | H04B 10/07 |
| 9,172,525 B2* | 10/2015 | Cao | H04L 7/04 |
| 9,209,920 B2* | 12/2015 | Mizrahi | H04J 3/0661 |
| 9,209,921 B2* | 12/2015 | Bui | H04J 3/0641 |
| 9,256,247 B2* | 2/2016 | Banerjea | H04J 3/0664 |
| 9,331,837 B2* | 5/2016 | Xu | H04J 3/14 |
| 9,391,768 B2* | 7/2016 | Roberts | H04B 10/27 |
| 9,407,733 B1* | 8/2016 | Mizrahi | H04L 69/22 |
| 9,438,364 B2* | 9/2016 | Bui | H04L 43/10 |
| 9,491,728 B2* | 11/2016 | Wen | H04J 3/0667 |
| 9,628,259 B2* | 4/2017 | Lanzone | H04J 3/065 |
| 9,665,121 B2* | 5/2017 | Aweya | G06F 1/12 |
| 9,671,822 B2* | 6/2017 | Aweya | G06F 1/12 |
| 9,686,034 B2* | 6/2017 | Ruffini | H04J 3/065 |
| 9,699,051 B2* | 7/2017 | Ratä | H04L 43/106 |
| 9,705,770 B2* | 7/2017 | Cavaliere | H04B 10/07 |
| 9,806,835 B2* | 10/2017 | Mizrahi | H04J 3/0602 |
| 9,843,405 B2* | 12/2017 | Aweya | H04J 3/0667 |
| 9,923,796 B2* | 3/2018 | Mirsky | H04L 69/28 |
| 9,929,855 B2* | 3/2018 | Ruffini | H04J 7/0016 |
| 10,075,258 B2* | 9/2018 | Dutti | H04L 43/0864 |
| 2003/0048754 A1* | 3/2003 | Bruckman | H04L 12/427 370/252 |
| 2004/0248520 A1* | 12/2004 | Miyoshi | H04B 7/2659 455/67.13 |
| 2007/0081562 A1 | 4/2007 | Ma | |
| 2007/0121523 A1* | 5/2007 | Morandin | H04J 3/0682 370/252 |
| 2007/0213038 A1* | 9/2007 | Masseroni | H04L 29/06027 455/414.3 |
| 2008/0075217 A1* | 3/2008 | Ilnicki | H04J 3/0667 375/356 |
| 2008/0080562 A1* | 4/2008 | Burch | H04J 3/0667 370/503 |
| 2008/0170579 A1 | 7/2008 | Chafle et al. | |
| 2009/0141646 A1* | 6/2009 | Legg | H04L 47/10 370/252 |
| 2009/0238094 A1* | 9/2009 | Miyoshi | H04B 7/2659 370/253 |
| 2009/0276542 A1* | 11/2009 | Aweya | H04J 3/0667 709/248 |
| 2010/0085990 A1* | 4/2010 | Belhadj | H04J 3/0667 370/517 |
| 2010/0157975 A1* | 6/2010 | In | H04J 3/0682 370/350 |
| 2010/0329125 A1* | 12/2010 | Roberts | H04J 3/0667 370/241.1 |
| 2011/0087803 A1* | 4/2011 | Sun | H04J 3/0673 709/248 |
| 2011/0090814 A1* | 4/2011 | Legg | H04L 47/10 370/252 |
| 2011/0199930 A1* | 8/2011 | Miyoshi | H04B 7/2659 370/252 |
| 2011/0250918 A1* | 10/2011 | Jen | H04W 52/08 455/509 |
| 2012/0128011 A1* | 5/2012 | Holmeide | H04J 3/0697 370/474 |
| 2012/0195256 A1* | 8/2012 | Khoury | H04W 56/0035 370/328 |
| 2013/0034197 A1* | 2/2013 | Aweya | H04J 3/0664 375/362 |
| 2013/0202291 A1* | 8/2013 | Cavaliere | H04B 10/07 398/33 |
| 2013/0216218 A1* | 8/2013 | Cao | H04L 7/04 398/25 |
| 2013/0235888 A1* | 9/2013 | Bui | H04J 3/0641 370/503 |
| 2013/0282875 A1* | 10/2013 | Aweya | H04J 3/0667 709/219 |
| 2014/0056234 A1* | 2/2014 | Hedlund | H04W 24/02 370/329 |
| 2014/0079409 A1* | 3/2014 | Ruffini | H04J 3/065 398/154 |
| 2014/0146811 A1* | 5/2014 | Wen | H04J 3/0667 370/350 |
| 2014/0226984 A1* | 8/2014 | Roberts | H04B 10/27 398/66 |
| 2014/0233590 A1* | 8/2014 | Someya | H04J 3/0667 370/503 |
| 2014/0247839 A1* | 9/2014 | Kingsley | H04J 3/0673 370/503 |
| 2015/0071309 A1* | 3/2015 | Aweya | H04J 3/0682 370/503 |
| 2015/0092794 A1* | 4/2015 | Aweya | H04J 3/0667 370/503 |
| 2015/0139663 A1* | 5/2015 | Lanzone | H04J 3/065 398/154 |
| 2015/0171980 A1* | 6/2015 | Bui | H04L 43/10 370/393 |
| 2015/0215108 A1* | 7/2015 | Xu | H04J 3/14 370/503 |
| 2015/0288473 A1* | 10/2015 | Ruffini | H04J 3/065 398/154 |
| 2015/0304066 A1* | 10/2015 | Dutti | H04L 43/0864 398/98 |
| 2016/0007360 A1* | 1/2016 | Nguyen | H04L 5/0053 370/280 |
| 2016/0105341 A1* | 4/2016 | Cavaliere | H04B 10/07 398/33 |
| 2016/0170437 A1* | 6/2016 | Aweya | H04J 3/0667 713/503 |

(56) References Cited

U.S. PATENT DOCUMENTS

| | | | | |
|---|---|---|---|---|
| 2016/0170439 A1* | 6/2016 | Aweya | ............ | G06F 1/12 |
| | | | | 713/401 |
| 2016/0170440 A1* | 6/2016 | Aweya | ............ | G06F 1/12 |
| | | | | 713/503 |
| 2016/0191632 A1* | 6/2016 | Mirsky | ............ | H04L 69/28 |
| | | | | 709/224 |
| 2017/0005903 A1* | 1/2017 | Mirsky | ............ | H04L 69/28 |
| 2017/0041961 A1* | 2/2017 | Zou | ............ | H04W 74/0875 |
| 2017/0093560 A1* | 3/2017 | Overton | ............ | H04L 7/02 |
| 2017/0195110 A1* | 7/2017 | Ruffini | ............ | H04L 7/0016 |
| 2017/0288801 A1* | 10/2017 | Aweya | ............ | H04J 3/0661 |
| 2018/0026735 A1* | 1/2018 | Chen | ............ | H04L 7/00 |
| | | | | 370/350 |

FOREIGN PATENT DOCUMENTS

| | | | | | |
|---|---|---|---|---|---|
| CN | 101814984 | A | | 8/2010 | |
| CN | 102171966 | A | | 8/2011 | |
| CN | 103117829 | A | | 5/2013 | |
| CN | 103152285 | A | | 6/2013 | |
| CN | 103401813 | A | | 11/2013 | |
| CN | 103718483 | A | * | 4/2014 | ............ H04J 3/065 |
| CN | 103795649 | A | | 5/2014 | |
| CN | 105594146 | A | * | 5/2016 | ............ H04J 3/0667 |
| CN | 103718483 | B | * | 9/2016 | ............ H04J 3/065 |
| CN | 106330376 | A | * | 1/2017 | ............ H04J 3/065 |
| CN | 106330421 | A | * | 1/2017 | ............ H04L 7/00 |
| CN | 106330376 | B | * | 12/2017 | ............ H04J 3/065 |
| EP | 2676389 | A2 | * | 12/2013 | ............ H04J 3/065 |
| EP | 2706686 | A1 | | 3/2014 | |
| EP | 2731303 | A1 | * | 5/2014 | ............ H04J 3/0667 |
| EP | 2731303 | A4 | * | 1/2015 | ............ H04J 3/0667 |
| EP | 2676389 | B1 | * | 8/2016 | ............ H04J 3/065 |
| EP | 3053289 | A1 | * | 8/2016 | ............ H04J 3/0667 |
| PL | 2676389 | T3 | * | 2/2017 | ............ H04J 3/065 |
| PT | 2676389 | T | * | 11/2016 | ............ H04J 3/065 |
| RU | 2013142096 | A | * | 3/2015 | ............ H04J 3/065 |
| WO | WO-2012110109 | A2 | * | 8/2012 | ............ H04J 3/065 |
| WO | WO-2013020499 | A1 | * | 2/2013 | ............ H04J 3/0667 |
| WO | WO-2014139461 | A1 | * | 9/2014 | ......... H04L 43/0829 |
| WO | 2015049481 | A1 | | 4/2015 | |
| WO | WO-2015049481 | A1 | * | 4/2015 | ............ H04J 3/0667 |
| WO | WO-2012110109 | A3 | * | 6/2015 | ............ H04J 3/065 |
| WO | WO-2016177240 | A1 | * | 11/2016 | ............ H04L 7/00 |

OTHER PUBLICATIONS

Lv et al., An Enhanced IEEE 1588 Time Synchronization for Asymmetric Communication Link in Packet Transport Network, Aug. 2010, IEEE Communications Letters, vol. 14, No. 8 (Year: 2010).*

Wang et al., Fairness Control Algorithm Based on IEEE 1588, 2009, 2009 Third International Conference on Genetic and Evolutionary Computing (Year: 2009).*

Yang et al, New Algorithm for IEEE 1588 Time Synchronization under the Presence of Significant Delay Variation, Nov. 22, 2013, 2013 3rd International Conference on Consumer Electronics, Communications and Networks (Year: 2013).*

"3rd Generation Partnership Project; Technical Specification Group Radio Access Network; Evolved Universal Terrestrial Radio Access (E-UTRA); Base Station (BS) radio transmission and reception (Release 12)," 3GPP TS 36.104 V12.7.0, pp. 1-155, 3rd Generation Partnership Project, Valbonne, France (Mar. 2015).

"IEEE Standard for a Precision Clock Synchronization Protocol for Networked Measurement and Control Systems," IEEE Std 1588™—2008, IEEE Instrumentation and Measurement Society, Institute of Electrical and Electronics Engineers, New York, New York (Jul. 24, 2008).

"Common Public Radio Interface (CPRI); Interface Specification," CPRI Specification V7.0, pp. 1-128, (Oct. 9, 2015).

"Universal Mobile Telecommunications System (UMTS); Evolved Universal Terrestrial Radio Access (E-UTRA) and Evolved Universal Terrestrial Radio Access (E-UTRAN); Overall description; Stage 2 (3GPP TS 36.300 version 8.2.0 Release 8)," ETSI TS 136 300 V8.2.0, Technical Specification, pp. 1-111, European Telecommunications Standards Institute, Sophia Antipolis, France (Oct. 2007).

"Response LS on timing advance calculation using time difference measurement," 3GPP TSG RAN WG4 Meeting #60, R4-114843, RAN4, Athens, Greece, pp. 1-2, 3rd Generation Partnership Project—Valbonne, France (Aug. 22-26, 2011).

Boxing, "Research and Application on Time Synchronization algorithm in asymmetirc Communication Link," South China University of Technology, Guangzhou, China, pp. 1-72, Institute of Electrical and Electronics Engineers—New York, New York (May 2014).

Xie, "A Method of Automatic Compensate of PTP Non-symmetry in Transmission Network," nCNKI. Deda Xie., New Application. pp. 1-3, Huawei (Sep. 2014).

* cited by examiner

COMMUNICATIONS NETWORK DELAY VARIATION SMOOTHING METHOD, APPARATUS, AND SYSTEM

CROSS-REFERENCE TO RELATED APPLICATIONS

This application is a continuation of International Application No. PCT/CN2015/097537, filed on Dec. 16, 2015, which claims priority to Chinese Patent Application No. 201510217473.1, filed on Apr. 30, 2015. The disclosures of the aforementioned applications are hereby incorporated by reference in their entireties.

TECHNICAL FIELD

The present application relates to the field of communications, and in particular, to a communications network delay variation smoothing method, an apparatus, and a system.

BACKGROUND

Nowadays, with the rapid development of network technologies, communications networks become more centralized, complex, and intelligent. In networking of a communications network, as a quantity of network devices continuously increases, higher requirements are imposed on performance of the network devices and a coupling degree between the network devices. Generally, a communications network provides a bi-directional service flow transmission service. Inevitably, an asymmetric delay (English full name: Asymmetric delay) exists between a forward service flow direction and a reverse service flow direction, that is, asymmetry exists between a delay generated in the forward service flow direction and a delay generated in the reverse service flow direction. For example, a bi-directional asymmetric delay variation exists during data transmission on all such communications networks as a wireless communications network (for example, a mobile communications network), a wired communications network (for example, an asymmetric digital subscriber line (English full name: Asymmetric digital subscriber line, English acronym: ADSL), a very-high-data-rate digital subscriber line (English full name: Very-high-data-rate digital subscriber line, English acronym: VDSL)), or a dedicated communications network (for example, a power communications network).

Using mobile communications networks as an example, a clean, centralized processing, collaborative radio, and real-time cloud radio access network (English full name: Clean, centralized processing, collaborative radio, and real-time cloud radio access network, English acronym: C-RAN) is used in a modern mobile communications network. The C-RAN has characteristics such as centralization, collaboration, and virtualization. In a C-RAN architecture, centralization of a baseband control unit (English full name: Baseband control unit, English acronym BBU) increases the distance between a remote radio unit (English full name: Remote radio unit, English acronym: RRU) and the BBU. Therefore, a corresponding transport network needs to be deployed to implement data transmission between the RRU and the BBU. Such a transport network is referred to as a fronthaul network (English full name: FrontHaul). The fronthaul network may be built using optical transport devices or packet switched devices. Inevitably, a bi-directional asymmetric delay variation would be brought into a bi-directional data transmitting and receiving path.

Based on the above, there is a strict requirement on the range of a bi-directional asymmetric delay variation of data transmission on a communications network, and if the variation exceeds a limit, abnormal user communication is caused.

SUMMARY

In view of this, embodiments of the present application provide a communications network delay variation smoothing method, an apparatus, and a system, to resolve a problem of abnormal user communication that is caused when a bi-directional asymmetric delay variation exceeds a limit.

Technical solutions provided in the embodiments of the present application are as follows:

According to a first aspect, a method for initializing communications network delay variation smoothing is provided, including:

clearing, by a receiving module of a local device, a forward delay threshold and a reverse delay threshold when an initialization time starts;

determining, by the receiving module of the local device, a real-time forward delay value corresponding to a current service flow fragment, and receiving a reverse delay threshold that is corresponding to the current service flow fragment and is sent by a sending module of a peer device;

when determining that a maximum value between the real-time forward delay value corresponding to the current service flow fragment and the reverse delay threshold corresponding to the current service flow fragment is greater than a current value of the forward delay threshold, replacing, by the receiving module of the local device, the current value of the forward delay threshold with the maximum value; and when determining that the initialization time has not ended, returning, by the receiving module of the local device, to performing obtaining of a real-time forward delay value corresponding to a next service flow fragment and a reverse delay threshold corresponding to the next service flow fragment.

According to a second aspect, a compensation method is provided, where the compensation method is applied after the initialization time according to the first aspect has ended, and the compensation method includes:

when determining that the forward delay threshold after the initialization ends is greater than a real-time forward delay value corresponding to a first service flow fragment, using, by the receiving module of the local device, a difference between the forward delay threshold after the initialization ends and the real-time forward delay value corresponding to the first service flow fragment as a delay compensation time for the first service flow fragment.

In a first possible implementation manner of the second aspect, the method further includes:

when receiving, by the receiving module of the local device, a re-initialization signal sent by the sending module of the peer device, returning to perform the initialization according to the first aspect.

In a second possible implementation manner of the second aspect, the method further includes:

when determining that a service channel status is abnormal, returning, by the receiving module of the local device, to perform the initialization according to the first aspect.

In a third possible implementation manner of the second aspect, the method further includes:

when determining that a quantity of times that a difference obtained by subtracting a real-time forward delay value of each service flow fragment from the forward delay threshold after the initialization ends exceeds a limit value within a first preset period reaches a first threshold, returning, by the receiving module of the local device, to perform the initialization according to the first aspect.

In a fourth possible implementation manner of the second aspect, the method further includes:

when determining that a quantity of times that a real-time forward delay value of each service flow fragment is less than a waiting time of the service flow fragment for entering a service cache unit within a second preset period reaches a second threshold, returning, by the receiving module of the local device, to perform the initialization according to the first aspect.

According to a third aspect, a receiving module of a local device is provided, where the receiving module of the local device includes a setting unit configured to perform initialization, an obtaining unit configured to perform initialization, a determining unit configured to perform initialization, and a returning unit configured to perform initialization, where:

the setting unit is configured to clear a forward delay threshold and a reverse delay threshold when an initialization time starts;

the obtaining unit is configured to determine a real-time forward delay value corresponding to a current service flow fragment and receive a reverse delay threshold that is corresponding to the current service flow fragment and is sent by a sending module of a peer device;

the determining unit is configured to: when determining that a maximum value between the real-time forward delay value corresponding to the current service flow fragment and the reverse delay threshold corresponding to the current service flow fragment is greater than a current value of the forward delay threshold, replace the current value of the forward delay threshold with the maximum value; and the returning unit is configured to: when determining that the initialization time has not ended, return to performing obtaining of a real-time forward delay value corresponding to a next service flow fragment and a reverse delay threshold corresponding to the next service flow fragment.

In a first possible implementation manner of the third aspect, the receiving module of the local device further includes:

a compensation unit, configured to: when determining that the forward delay threshold after the initialization ends is greater than a real-time forward delay value corresponding to a first service flow fragment, use a difference between the forward delay threshold after the initialization ends and the real-time forward delay value corresponding to the first service flow fragment as a delay compensation time for the first service flow fragment.

In a second possible implementation manner of the third aspect, the receiving module of the local device further includes:

a processing unit, configured to: when receiving a re-initialization signal sent by the sending module of the peer device, return to perform the initialization.

In a third possible implementation manner of the third aspect, the receiving module of the local device further includes:

a first processing unit, where the first processing unit is configured to: when determining that a service channel status is abnormal, return to perform the initialization.

In a fourth possible implementation manner of the third aspect, the receiving module of the local device further includes:

a second processing unit, configured to: when determining that a quantity of times that a difference obtained by subtracting a real-time forward delay value of each service flow fragment from the forward delay threshold after the initialization ends exceeds a limit value within a first preset period reaches a first threshold, return to perform the initialization.

In a fifth possible implementation manner of the third aspect, the receiving module of the local device further includes:

a third processing unit, configured to: when determining that a quantity of times that a real-time forward delay value of each service flow fragment is less than a waiting time of the service flow fragment for entering a service cache unit within a second preset period reaches a second threshold, return to perform the initialization.

According to a fourth aspect, a communications system is provided, including:

a sending module of a peer device and the receiving module of the local device according to the third aspect or any possible implementation manner of the third aspect.

In a first possible implementation manner of the fourth aspect, the communications system further includes a forwarding module.

In the embodiments of the present application, a receiving module clears a forward delay threshold and a reverse delay threshold when an initialization time starts; and performing the following operation for each service flow fragment within the initialization time: when determining that a maximum value between a real-time forward delay value corresponding to a current service flow fragment and a reverse delay threshold corresponding to the current service flow fragment is greater than a current value of the forward delay threshold, replaces the current value of the forward delay threshold with the maximum value. In this way, after the initialization ends, a delay threshold after the initialization ends is determined and is applied to delay compensation, thereby significantly reducing a bi-directional asymmetric delay variation, and avoiding a problem of abnormal user communication that is caused when the variation exceeds a limit.

DESCRIPTION OF EMBODIMENTS

Embodiments of the present application provide a communications network delay variation smoothing method, an apparatus, and a system, so as to significantly reduce a bi-directional asymmetric delay variation in a service scenario in which a sending module of a peer device interacts with a receiving module of a local device, and avoid a problem of abnormal user communication that is caused when the variation exceeds a limit.

The following provides detailed descriptions separately by using specific embodiments.

To make the application objectives, features, and advantages of the present application clearer and more comprehensible, the following clearly describes the technical solutions in the embodiments of the present application with reference to the accompanying drawings in the embodiments of the present application. Apparently, the embodiments described below are merely a part rather than all of the embodiments of the present application. All other embodiments obtained by a person of ordinary skill in the art based on the embodiments of the present application without creative efforts shall fall within the protection scope of the present application.

In the specification, claims, and accompanying drawings of the present application, the terms "first", "second", "third", "fourth", and so on are intended to distinguish between different objects but do not indicate a particular order. In addition, the terms "include" and "contain" mean to cover the non-exclusive inclusion, for example, a process, method, system, product, or device that includes a list of steps or units is not necessarily limited to the list of steps and units, but may further include steps and units not listed.

In the specification, claims, and accompanying drawings of this application, the term "local device" refers to a device at an end of a link of a communications network, and the term "peer device" refers to a device at the other end of the link of the communications network.

Figure 1:
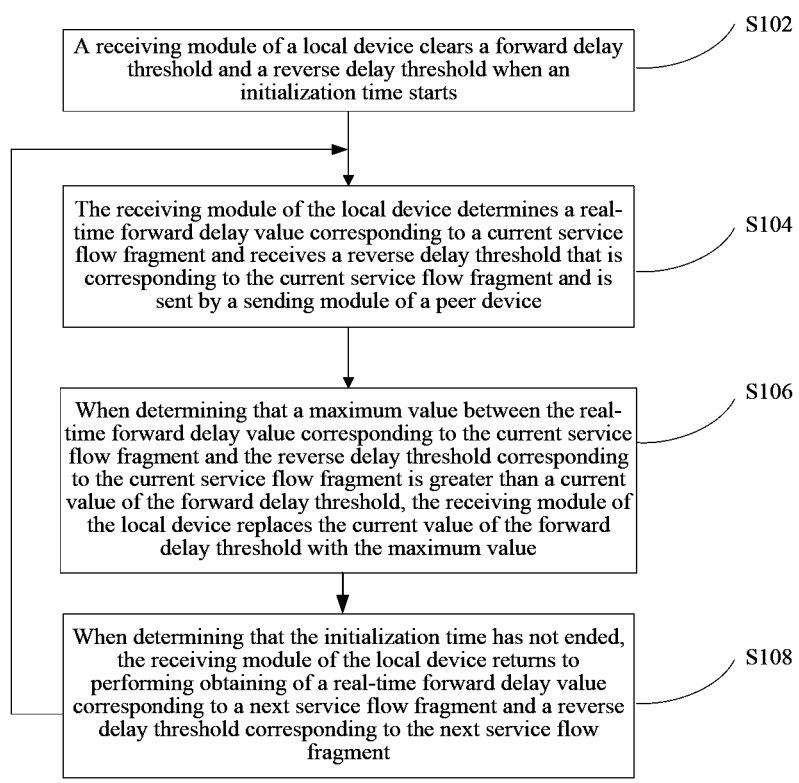
FIG. 1 is a flowchart of a method for initializing communications network delay variation smoothing according to an embodiment of the present application.

FIG. 1 is a flowchart of a method for initializing communications network delay variation smoothing according to an embodiment of the present application. As shown in FIG. 1, the method may include the following steps.

S102: A receiving module of a local device clears a forward delay threshold and a reverse delay threshold when an initialization time starts.

By way of example, for a to-be-transmitted service flow, a link of a communications network is bi-directional. For one direction, service frame mapping is performed on the service flow on a device at an end of the link of the communications network to form service frames, service frame de-mapping is performed at the other end of the link of the communications network to form service flow fragments, and a continuous service flow is recovered by reading out the service flow fragments. The same process is performed for the other direction. As regards a process of bi-directional transmission of the service flow, although the same process is performed, delays in two directions may be different. Therefore, a bi-directional asymmetric delay variation exists. A local device may include a sending module and a receiving module, and a peer device may include a sending module and a receiving module. The sending module may implement a service frame mapping function, and the receiving module may implement a service frame de-mapping function. In this way, a direction in which the service flow flows from the sending module of the peer device to the receiving module of the local device may be referred to as a forward direction of the service flow, and a direction in which the service flow flows from the sending module of the local device to the receiving module of the peer device may be referred to as a reverse direction of the service flow. For example, a BBU device and an RRU device in a C-RAN are respectively disposed at two ends of the link of the communications network, a sending module and a receiving module may be disposed on the BBU device, and a sending module and a receiving module may also be disposed on the RRU device.

By way of example, to obtain accurate delay compensation, an initialization process may be performed on the receiving module. In an example in which an initialization process is performed on the receiving module of the local device, when determining that an initialization time starts, the receiving module of the local device clears a forward delay threshold and a reverse delay threshold. The forward delay threshold is determined by the receiving module of the local device and may be synchronized to the sending module of the peer device by a synchronization means. The reverse delay threshold is determined by the receiving module of the peer device, and the reverse delay threshold may be synchronized to the sending module of the local device. The initialization time refers to a period of time that the initialization process lasts for. For example, the initialization time may be indicated by a starting time point and an ending time point. For example, the starting time point of the initialization is 12:00, the ending time point of the initialization is 12:15, and accordingly the period of time that the initialization lasts for is 15 minutes. The initialization time may be manually set or may be automatically generated and automatically adjusted by the receiving module of the local device according to a control policy. For example, when performing initialization, the receiving module of the local device automatically sets the initialization time to 5 minutes; after the initialization is complete, the receiving module of the local device re-triggers initialization and automatically adjusts the period of time of the initialization, for example, to 10 minutes, if finding in a subsequent compensation process that a result obtained in the initialization process exceeds a particular threshold range and needs to be corrected.

By way of example, for the operation of clearing a forward delay threshold and a reverse delay threshold, when the initialization stage starts, there may be stored historical values of the forward delay threshold and the reverse delay threshold, for example, a forward delay threshold and a reverse delay threshold determined in a previous initialization process, may be stored. Therefore, in order not to affect an effect of an initialization process, the forward delay threshold and the reverse delay threshold are cleared at a starting time point of the initialization process.

S104: The receiving module of the local device determines a real-time forward delay value corresponding to a current service flow fragment and receives a reverse delay threshold that is corresponding to the current service flow fragment and is sent by a sending module of a peer device.

By way of example, the service flow is continuously transmitted. Accordingly, service frames are also continuously transmitted from one end to the other end of the link of the communications network. For example, service frames are transmitted from the sending module of the peer device to the receiving module of the local device. A plurality of service frames is transmitted during the initialization time, and after arriving at the receiving module of the local device, the service frames are de-mapped to form service flow fragments. The receiving module of the local device determines a real-time forward delay value corresponding to a current service flow fragment. The real-time forward delay value refers to a delay of transmission of the service frame on the link of the communications network. For example, when the sending module of the peer device performs a service frame mapping operation on a service flow, a service frame is formed. When the service frame enters the link of the communications network, the sending module of the peer device performs delay measurement and marks an egress time stamp. Information about the egress time stamp may be synchronized to the receiving module of the local device. When receiving the service frame from the link of the communications network, the receiving module of the local device performs delay measurement and marks an ingress time stamp. In this way, the ingress time stamp and the egress time stamp are the real-time forward delay value corresponding to the current service flow fragment.

For example, the receiving module of the local device receives the reverse delay threshold that is corresponding to the current service flow fragment and is sent by the sending module of the peer device. The receiving module of the peer device may determine the reverse delay threshold according to a reverse transmission path of the service flow. In this way, the sending module of the peer device may send the reverse delay threshold corresponding to the current service flow fragment to the receiving module of the local device in a synchronous manner. Therefore, the receiving module of the local device may obtain the real-time forward delay value corresponding to the current service flow fragment and the reverse delay threshold corresponding to the current service flow fragment.

S106: When determining that a maximum value between the real-time forward delay value corresponding to the current service flow fragment and the reverse delay threshold corresponding to the current service flow fragment is greater than a current value of the forward delay threshold, the receiving module of the local device replaces the current value of the forward delay threshold with the maximum value.

By way of example, for example, after obtaining the real-time forward delay value corresponding to the current service flow fragment and the reverse delay threshold corresponding to the current service flow fragment, the receiving module of the local device determines a maximum value between the two values, compares the maximum value with the current value of the forward delay threshold, and when the maximum value is greater than the current value of the forward delay threshold, replaces the current value of the forward delay threshold with the maximum value. For another example, when the maximum value is less than or equal to the current value of the forward delay threshold, the current value of the forward delay threshold is kept unchanged.

S108: When determining that the initialization time has not ended, the receiving module of the local device returns to performing obtaining of a real-time forward delay value corresponding to a next service flow fragment and a reverse delay threshold corresponding to the next service flow fragment.

By way of example, when determining that the initialization time has not ended, the receiving module of the local device returns to step S104 to obtain a real-time forward delay value corresponding to a next service flow fragment and a reverse delay threshold corresponding to the next service flow fragment. Because the obtaining process is similar to the foregoing description on step S104, details are not described herein again. After obtaining the real-time forward delay value corresponding to the service flow fragment and the reverse delay threshold corresponding to the next service flow fragment, the receiving module of the local device performs step S106 to determine a maximum value between the two values, then compare the maximum value between the real-time forward delay value corresponding to the next service flow fragment and the reverse delay threshold corresponding to the next service flow fragment with a current value of the forward delay threshold, and when the maximum value is greater than the current value of the forward delay threshold, replace the current value of the forward delay threshold with the maximum value corresponding to the next service flow fragment. In this way, within the initialization time, steps S104 and S106 are repeatedly performed until the initialization time has ended. Therefore, when the initialization time has ended, a forward delay threshold after the initialization ends is determined.

By way of example, in the foregoing steps S102 to S108, the initialization process is described by using the receiving module of the local device as an example. Correspondingly, by performing an initialization process, the receiving module of the peer device may determine a reverse threshold delay value after the initialization ends. The initialization process performed by the receiving module of the peer device is similar to that performed by the receiving module of the local device, and details are not described herein again.

By way of example, on one hand, when a communications system is started, a link of a communications network that transmits a service flow may be in an unstable state. Therefore, when the communications system is started, an initialization process may be performed to determine an optimal delay threshold. On another hand, for example, when the receiving module of the local device performs an initialization process, to ensure consistency between delays in two directions of the link, the receiving module of the peer device also performs an initialization process. On still another hand, in a normal communication process after the initialization is complete, when a particular condition is met, the receiving module of the local device triggers a re-initialization process.

In the communications network delay variation smoothing method provided by this embodiment, when the initialization ends, the receiving module of the local device determines a delay threshold after the initialization ends and applies the delay threshold to delay compensation, thereby significantly reducing a bi-directional asymmetric delay variation, and avoiding a problem of abnormal user communication that is caused when the variation exceeds a limit.

Optionally, after the foregoing initialization is complete, a compensation method includes: when determining that the forward delay threshold after the initialization ends is greater than a real-time forward delay value corresponding to a first service flow fragment, using, by the receiving module of the local device, a difference between the forward delay threshold after the initialization ends and the real-time forward delay value corresponding to the first service flow fragment as a delay compensation time for the first service flow fragment.

By way of example, after the initialization process is complete, a normal communication state is entered. For example, after performing the initialization process, the receiving module of the local device can determine the forward delay threshold after the initialization ends. When the receiving module of the local device processes the first service flow fragment, if the receiving module of the local device determines that the forward delay threshold after the initialization ends is greater than the real-time forward delay value corresponding to the first service flow fragment, the receiving module of the local device uses the difference between the forward delay threshold after the initialization ends and the real-time forward delay value corresponding to the first service flow fragment is used as the delay compensation time for the first service flow fragment. For example, the delay compensation time may be controlled by controlling a dwell time of the first service flow fragment in a service cache unit. In this way, same operations may be performed for each first service flow fragment during normal communication, to compensate for a delay of each service flow fragment, thereby significantly reducing a bi-directional asymmetric delay variation, and avoiding a problem of abnormal user communication that is caused when the variation exceeds a limit.

By way of example, when the forward delay threshold after the initialization ends is less than the real-time forward delay value corresponding to the first service flow fragment, no delay compensation needs to be performed for the first service flow fragment. For example, the first service flow fragment does not dwell in the service cache unit.

Optionally, when receiving a re-initialization signal sent by the sending module of the peer device, the receiving module of the local device returns to performing the initialization process.

By way of example, when starting to perform initialization, the receiving module of the local device uses the sending module of the local device to transmit a re-initialization signal to the receiving module of the peer device to instruct the receiving module of the peer device to perform initialization. That is, when the receiving module at one end starts to perform initialization, the receiving module at the other end also performs an initialization process. For example, in a normal communication process, the receiving module of the local device triggers an initialization process and at the same time, instructs the receiving module of the peer device to trigger an initialization process.

By way of example, the initialization processes of the receiving modules on the local device and the peer device may be synchronous. For example, when preparing to perform an initialization process, the receiving module of the local device may first synchronize a re-initialization signal to the sending module of the peer device. The re-initialization signal includes a starting time point and an ending time point of initialization. Therefore, the receiving modules at the two ends can each perform an initialization process within a same time period.

By way of example, the initialization processes of the receiving modules on the two ends may be asynchronous. For example, at the initialization stage, the forward delay threshold determined by the receiving module of the local device needs to be synchronized to the sending module of the peer device. Similarly, the reverse delay threshold determined by the receiving module of the peer device needs to be synchronized to the sending module of the local device. However, at a normal communication stage, the forward delay threshold and the reverse delay threshold do not need to be synchronized. Therefore, the forward delay threshold or the reverse delay threshold may be used as a re-initialization signal. For example, when the receiving module of the local device starts to perform initialization, the first forward delay threshold determined by the receiving module of the local device is synchronized to the sending module of the peer device; when receiving the first forward delay threshold, the sending module of the peer device notifies the receiving module of the peer device, so that the receiving module of the peer device triggers an initialization process. Similarly, the first reverse delay threshold determined by the receiving module of the peer device is synchronized to the sending module of the local device. Therefore, the receiving modules at the two ends both perform the initialization process. The ending time point of initialization does not need to be synchronized between the receiving modules at the two ends. For example, the receiving module of the local device has completed initialization, and the receiving module of the peer device has not completed initialization. In this case, the receiving module of the local device may still receive a reverse delay threshold synchronized from the peer end, and the receiving module of the local device does not need to process the received reverse delay threshold after having completed initialization. Meanwhile, in order not to affect next initialization, a time period in which a reverse delay threshold is received and not processed needs to be specifically limited.

Optionally, when determining that a service channel status is abnormal, the receiving module of the local device returns to performing the initialization process.

By way of example, in a normal communication process, the receiving module monitors the service channel status. For example, the receiving module of the local device monitors a channel status in the forward direction of the service flow, and the receiving module of the peer device monitors a channel status in the reverse direction of the service flow. When determining that the service channel status is abnormal, the receiving module of the local device performs the initialization process again.

Optionally, when determining that a quantity of times that a difference obtained by subtracting a real-time forward delay value of each service flow fragment from the forward delay threshold after the initialization ends exceeds a limit value within a first preset period reaches a first threshold, the receiving module of the local device returns to performing the initialization process.

By way of example, in a normal communication process after the initialization ends, the receiving module of the local device performs, according to the forward delay threshold after the initialization ends, corresponding compensation processing for each service flow fragment. When determining that the quantity of times that the difference obtained by subtracting the real-time forward delay value of each service flow fragment from the forward delay threshold after the initialization ends exceeds the limit value within the first preset period reaches the first threshold, the receiving module of the local device returns to performing the initialization process. According to the foregoing description in this embodiment, the forward delay threshold after the initialization ends may be greater than or less than the real-time forward delay value of the service flow fragment, and the difference obtained by subtracting the real-time forward delay value of each service flow fragment from the forward delay threshold after the initialization ends may be a positive value or a negative value. Therefore, the limit value is a range instead of a single value. If in the first preset period, the difference exceeds a value range limited by the limit value for multiple times, it indicates that the current forward delay threshold is not suitable for reducing a delay variation in the normal communication process. Therefore, when the quantity of times reaches the first threshold, the initialization process is performed again, and further, a forward delay threshold is determined again.

Optionally, when determining that a quantity of times that a real-time forward delay value of each service flow fragment is less than a waiting time of the service flow fragment for entering a service cache unit within a second preset period reaches a second threshold, the receiving module of the local device returns to performing the initialization process.

By way of example, in a normal communication process after the initialization ends, the receiving module of the local device performs, according to the forward delay threshold after the initialization ends, corresponding compensation processing for each service flow fragment. When determining that the quantity of times that the real-time forward delay value of each service flow fragment is less than the waiting time of the service flow fragment for entering the service cache unit within the second preset period reaches the second threshold, the receiving module of the local device returns to performing the initialization process. According to the foregoing description in this embodiment, when determining that the forward delay threshold after the initialization ends is greater than a real-time forward delay value corresponding to a first service flow fragment, the receiving module of the local device uses a difference between the forward delay threshold after the initialization ends and the real-time forward delay value corresponding to the first service flow fragment as a delay compensation time for the first service flow fragment. In an implementation, for example, the delay compensation time may be controlled by controlling a dwell time of the first service flow fragment in the service cache unit. For example, if the delay compensation time is 60 nanoseconds, a dwell time of the service flow fragment in the service cache unit may be set to 60 nanoseconds. Certainly, there are continuous service flow fragments, and it is possible that the service cache unit cannot receive more service flow fragments if excess service flow fragments dwell in the service cache unit. In this case, an incoming service flow fragment waits for entering the service cache unit, and a waiting time is required. For example, if the delay compensation time is 60 nanoseconds, and the waiting time of the service flow for entering the service cache unit is 10 nanoseconds, the dwell time of the service flow fragment in the service cache unit may be set to 50 nanoseconds. That is, the waiting time needs to be deducted from the compensation time. Certainly, for another example, if the delay compensation time is 60 nanoseconds, and the waiting time of the service flow for entering the service cache unit is 70 nanoseconds, the service flow fragment does not dwell in the service cache unit. Therefore, if the waiting time is excessively long or a case in which the waiting time is excessively long often occurs, it indicates that the delay threshold determined in the previous initialization process is no longer suitable, and re-initialization needs to be performed to determine a new delay threshold.

By way of example, in the foregoing description, the initialization process and the re-initialization process that is performed according to a condition in a normal communication state are described with reference to a manner in which the receiving module of the local device determines a forward delay threshold. However, in fact, a manner in which the receiving module of the peer device determines a reverse delay threshold is similar to the foregoing description, and details are not described herein again.

In a common implementation manner in which the solution of this embodiment of the present application is not used, to alleviate the bi-directional asymmetric delay variation problem, clock precision of a communications device is usually improved, so as to determine a more accurate synchronization process, or a fixed delay compensation value is used to compensate for delays in two directions of the link. Such a conventional method cannot form a dynamic compensation manner. In particular, when a communications path changes or becomes abnormal, a compensation policy cannot be automatically adjusted, and an objective of reducing the bi-directional asymmetric delay variation cannot be achieved.

However, in the technical solution provided by this embodiment of the present application, when the initialization ends, the receiving module determines a delay threshold after the initialization ends and applies the delay threshold to delay compensation; and after a particular condition is met, re-triggers the initialization process. A dynamic compensation manner is ensured, and when a communications path changes or becomes abnormal, a compensation policy is automatically adjusted, thereby significantly reducing a bi-directional asymmetric delay variation and avoiding a problem of abnormal user communication that is caused when the variation exceeds a limit.

Figure 2:
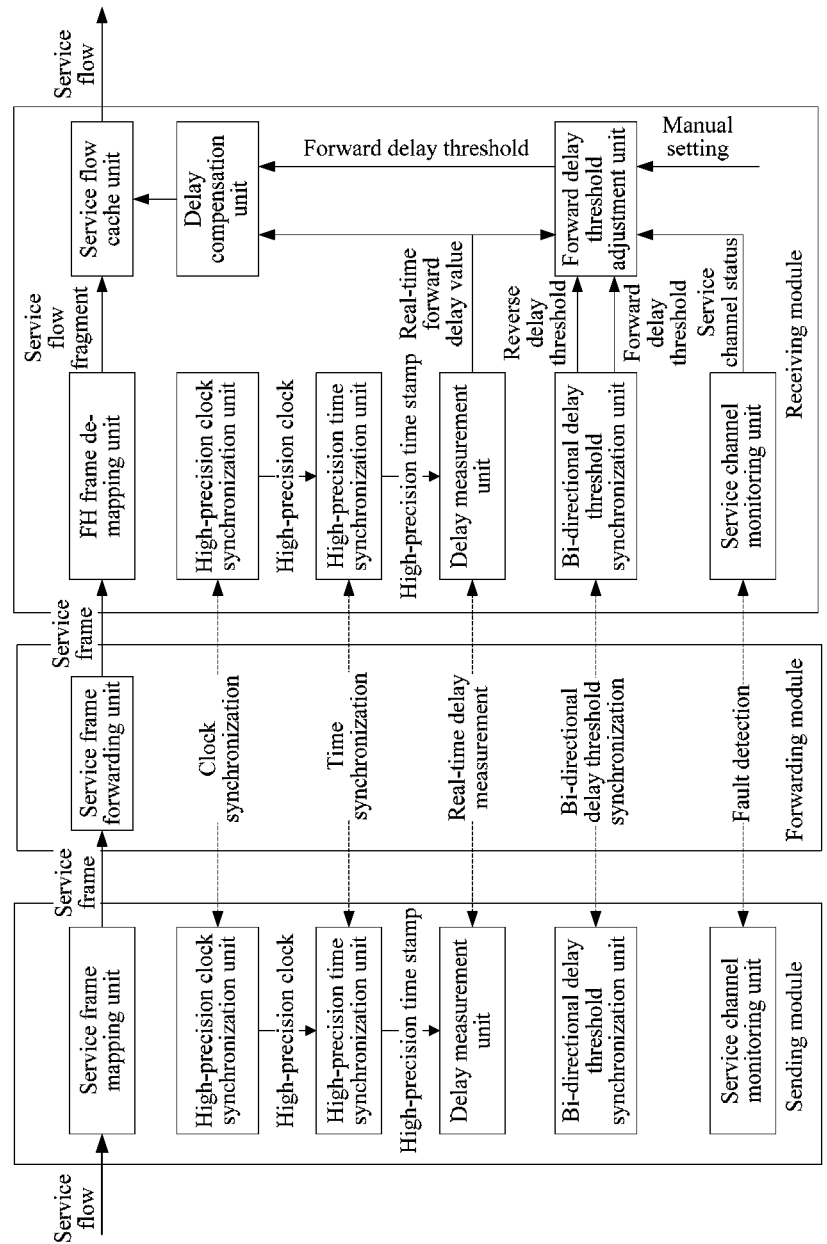
FIG. 2 is a schematic diagram of an implementation scenario of a method according to an embodiment of the present application.

FIG. 2 is a schematic diagram of an implementation scenario of a method according to an embodiment of the present application. FIG. 2 describes in further detail a communications network delay variation smoothing process from perspectives of a service flow direction and a signal transmission manner. In FIG. 2, a receiving module of a local device and a sending module of a peer device are shown. However, in an actual application, the local device may further include a sending module, the peer device may further include a receiving module, and their structures are correspondingly the same. Therefore, the receiving module of the local device and the sending module of the peer device are used as an example for description below.

By way of example, the sending module includes a service frame mapping unit, a high-precision clock synchronization unit, a high-precision time synchronization unit, a delay measurement unit, a bi-directional delay threshold synchronization unit, and a service channel monitoring unit; the receiving module includes a service frame de-mapping unit, a high-precision clock synchronization unit, a high-precision time synchronization unit, a delay measurement unit, a bi-directional delay threshold synchronization unit, a service channel monitoring unit, a forward delay threshold adjusting unit, a delay compensation unit, and a service flow cache unit. In addition, when the sending module is relatively distant from the receiving module, a forwarding module may be provided between the sending module and the receiving module. The forwarding module includes a service frame forwarding unit, configured to forward a service frame.

By way of example, functions implemented by the foregoing units are as follows.

The service frame mapping unit converts a service flow into service frames that match a forwarding mode of a processed service. For example, in a fronthaul network, a service flow is converted into FH frames that match a fronthaul forwarding mode.

The service frame forwarding unit forwards the service frames. For example, in the fronthaul network, the service frame forwarding unit is responsible for transmitting the FH frames from the sending module to the receiving module according to a fronthaul forwarding rule.

The service frame de-mapping unit is responsible for recovering service flow fragments from the service frames.

For example, in the fronthaul network, the service flow fragments are recovered from the FH frames.

The service flow cache unit is responsible for caching the recovered service flow fragments, and when a dwell time meets a readout condition, reads out the service flow fragments, recovers a continuous service flow from the service flow fragments, and sends the continuous service flow out of the receiving module.

The high-precision clock synchronization unit is responsible for exchanging of precise clock information between the sending module and the receiving module, so as to implement high-precision clock synchronization. The clock synchronization information may be transferred by using a service frame or by using an independent clock message.

The high-precision time synchronization unit is responsible for exchanging of precise time information between the sending module and the receiving module, so as to implement high-precision time synchronization. The time synchronization information may be transferred by using a service frame or by using an independent time message.

The delay measurement unit is responsible for measuring a delay of the service frame in passing through a link of a communications network, by calculating a time difference between recorded egress and ingress time stamps of the service frame at two ends of the link of the communications network. Information about the time stamp may be transferred by using a service frame or by using independent delay measurement information.

The bi-directional delay threshold synchronization unit is responsible for synchronizing a delay threshold between the sending module and the receiving module in real time. The delay threshold may be transferred by using a service frame or by using an independent delay threshold message.

The service channel monitoring unit is responsible for monitoring a service channel status. Fault detection information may be transferred by using a service frame or by using a fault detection message.

The forward delay threshold adjusting unit is responsible for calculating and adjusting a forward path delay threshold by means of an initialization process.

The delay compensation unit is responsible for calculating a delay compensation time by using a forward delay threshold after the initialization ends and a real-time forward delay value corresponding to the service flow fragment, and controlling the service flow cache unit to perform compensation.

By way of example, based on the foregoing units, an implementation manner of the communications network delay variation smoothing process is as follows: The forward delay threshold adjusting unit implements a method for initializing communications network delay variation smoothing, including:

the forward delay threshold adjusting unit clears a forward delay threshold and a reverse delay threshold when an initialization time starts;

the forward delay threshold adjusting unit determines a real-time forward delay value corresponding to a current service flow fragment and receives a reverse delay threshold that is corresponding to the current service flow fragment and is sent by a sending module;

when the forward delay threshold adjusting unit determines that a maximum value between the real-time forward delay value corresponding to the current service flow fragment and the reverse delay threshold corresponding to the current service flow fragment is greater than a current value of the forward delay threshold, the forward delay threshold adjusting unit replaces the current value of the forward delay threshold with the maximum value; and when the forward delay threshold adjusting unit determines that the initialization time has not ended, the forward delay threshold adjusting unit returns to performing obtaining of a real-time forward delay value corresponding to a next service flow fragment and a reverse delay threshold corresponding to the next service flow fragment.

Optionally, a compensation method based on the foregoing initialization method includes: when the delay compensation method unit determines that the forward delay threshold after the initialization ends is greater than a real-time forward delay value corresponding to a first service flow fragment, the delay compensation method unit uses a difference between the forward delay threshold after the initialization ends and the real-time forward delay value corresponding to the first service flow fragment as a delay compensation time for the first service flow fragment.

Optionally, when the forward delay threshold adjustment unit receives a re-initialization signal sent by the sending module, the forward delay threshold adjustment unit returns to perform the initialization.

Optionally, when the forward delay threshold adjustment unit determines that a service channel status is abnormal, the forward delay threshold adjustment returns to perform the initialization.

Optionally, when the forward delay threshold adjustment unit determines that a quantity of times that a difference obtained by subtracting a real-time forward delay value of each service flow fragment from the forward delay threshold after the initialization ends exceeds a limit value within a first preset period reaches a first threshold, the forward delay threshold adjustment unit returns to perform the initialization.

Optionally, when the forward delay threshold adjustment unit determines that a quantity of times that a real-time forward delay value of each service flow fragment is less than a waiting time of the service flow fragment for entering a service cache unit within a second preset period reaches a second threshold, the forward delay threshold adjustment unit returns to perform the initialization.

FIG. 2 shows a schematic diagram of an implementation scenario of a method according to an embodiment of the present application, and the units in FIG. 2 can perform corresponding steps in the method of the foregoing embodiment. When the initialization ends, the receiving module determines a delay threshold after the initialization ends and applies the delay threshold to delay compensation; and after a particular condition is met, re-triggers the initialization process. A dynamic compensation manner is ensured, and when a communications path changes or becomes abnormal, a compensation policy is automatically adjusted, thereby significantly reducing a bi-directional asymmetric delay variation and avoiding a problem of abnormal user communication that is caused when the variation exceeds a limit.

Figure 3:
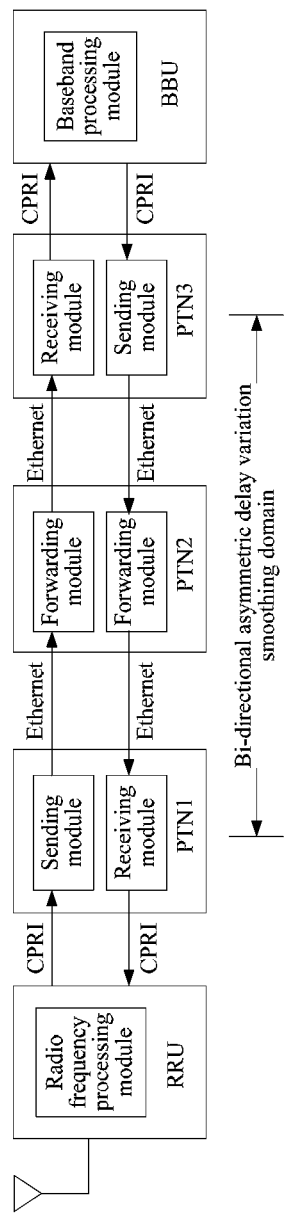
FIG. 3 is a schematic diagram of a first application scenario of a method according to an embodiment of the present application.

FIG. 3 is a schematic diagram of a first application scenario of a method according to an embodiment of the present application. In FIG. 3, a fronthaul network is implemented by using packet transport network (English full name: Packet transport network, English acronym: PTN) nodes. In FIG. 3, an RRU and a BBU are connected to PTN nodes by using common public radio interface (English full name: Common public radio interface, English acronym: CPRI), and the PTN nodes are connected to each other by using Ethernet (Ethernet) interfaces. A sending module and a receiving module are deployed on each of nodes PTN1 and PTN3 to be respectively responsible for forward transmission and reverse transmission of a service flow. In addition, a forwarding module deployed on node PTN2 may be further included. A link of a communications network between PTN1 and PTN3 forms a bi-directional asymmetric delay variation smoothing domain. The units in FIG. 3 can perform corresponding steps in the method of the foregoing embodiment, and details are not described herein again.

Figure 4:
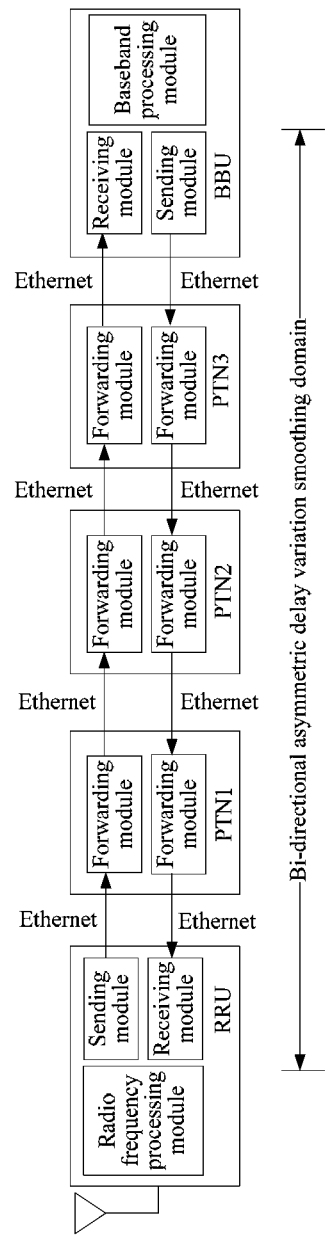
FIG. 4 is a schematic diagram of a second application scenario of a method according to an embodiment of the present application.

FIG. 4 is a schematic diagram of a second application scenario of a method according to an embodiment of the present application. A structure of FIG. 4 differs from the structure of FIG. 3 only in that the sending module and the receiving module in PTN1 are transferred to an RRU device and the sending module and receiving module in PTN3 are transferred to a BBU device. PTN1, PTN2, and PTN3 are responsible only for perform forwarding. A link of a communications network between the BBU and the RRU forms a bi-directional asymmetric delay variation smoothing domain. The units in FIG. 4 can perform corresponding steps in the method of the foregoing embodiment, and details are not described herein again.

Figure 5:
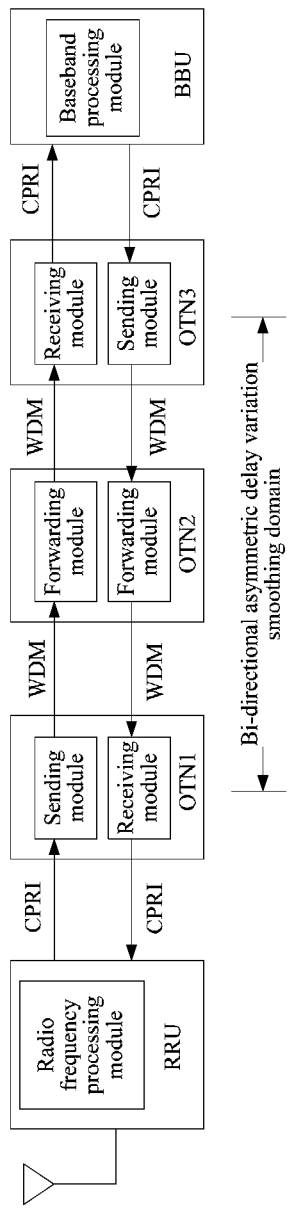
FIG. 5 is a schematic diagram of a third application scenario of a method according to an embodiment of the present application.

FIG. 5 is a schematic diagram of a third application scenario of a method according to an embodiment of the present application. In FIG. 5, a fronthaul network is implemented by using optical transport network (English full name: Optical transport network, English acronym: OTN) nodes. In FIG. 5, an RRU and a BBU are connected to OTN nodes by using CPRIs, and the OTN nodes are connected to each other by using wavelength division multiplexing (English full name: Wavelength division multiplexing, English acronym: WDM) interfaces. A sending module and a receiving module are deployed on each of nodes OTN1 and OTN3 to be respectively responsible for forward transmission and reverse transmission of a service flow. In addition, a forwarding module deployed on node PTN2 may be further included. A link of a communications network between OTN1 and OTN3 forms a bi-directional asymmetric delay variation smoothing domain. The units in FIG. 5 can perform corresponding steps in the method of the foregoing embodiment, and details are not described herein again.

Figure 6:
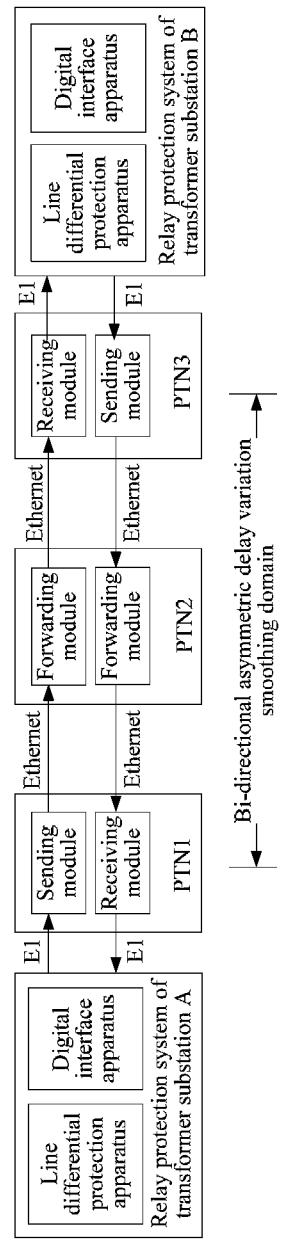
FIG. 6 is a schematic diagram of a fourth application scenario of a method according to an embodiment of the present application.

FIG. 6 is a schematic diagram of a fourth application scenario of a method according to an embodiment of the present application. In FIG. 6, a power communications network is implemented by using PTN nodes, and specifically, communication between relay protection systems of transformer substation A and transformer substation B is implemented. In FIG. 6, the relay protection system of transformer substation A and the relay protection system of transformer substation B are connected to PTN nodes by using E1 interfaces, and the PTN nodes are connected to each other by using Ethernet interfaces. A sending module and a receiving module are deployed on each of nodes PTN1 and PTN3 to be respectively responsible for forward transmission and reverse transmission of a service flow. In addition, a forwarding module deployed on node PTN2 may be further included. A link of a communications network between PTN1 and PTN3 forms a bi-directional asymmetric delay variation smoothing domain. The units in FIG. 6 can perform corresponding steps in the method of the foregoing embodiment, and details are not described herein again.

Figure 7:
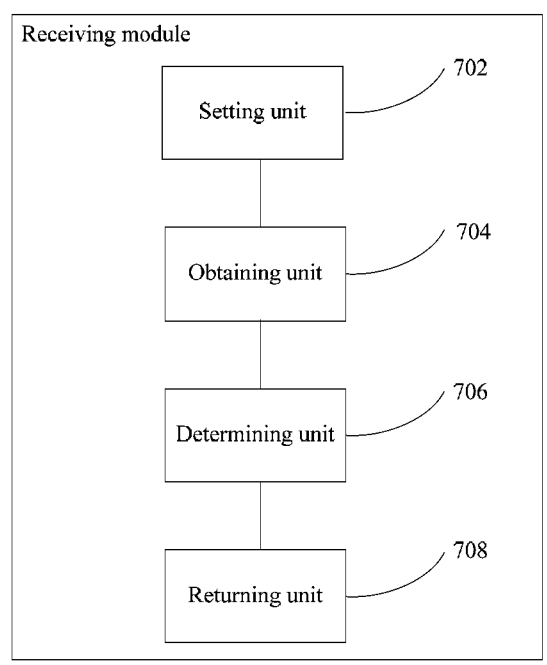
FIG. 7 is a schematic structural diagram of a receiving module of a local device according to an embodiment of the present application.

FIG. 7 is a schematic structural diagram of a receiving module of a local device according to an embodiment of the present application. The receiving module of the local device corresponding to FIG. 7 can perform corresponding steps in the method of the foregoing embodiment. As shown in FIG. 7, the receiving module of the local device includes: a setting unit 702 configured to perform initialization, an obtaining unit 704 configured to perform initialization, a determining unit 706 configured to perform initialization, and a returning unit 708 configured to perform initialization.

The setting unit 702 is configured to clear a forward delay threshold and a reverse delay threshold when an initialization time starts.

The obtaining unit 704 is configured to determine a real-time forward delay value corresponding to a current service flow fragment and receive a reverse delay threshold that is corresponding to the current service flow fragment and is sent by a sending module of a peer device.

The determining unit 706 is configured to: when determining that a maximum value between the real-time forward delay value corresponding to the current service flow fragment and the reverse delay threshold corresponding to the current service flow fragment is greater than a current value of the forward delay threshold, replace the current value of the forward delay threshold with the maximum value.

The returning unit 708 is configured to: when determining that the initialization time has not ended, return to performing obtaining of a real-time forward delay value corresponding to a next service flow fragment and a reverse delay threshold corresponding to the next service flow fragment.

Optionally, the receiving module of the local device further includes a compensation unit, and the compensation unit is configured to: when determining that the forward delay threshold after the initialization ends is greater than a real-time forward delay value corresponding to a first service flow fragment, use a difference between the forward delay threshold after the initialization ends and the real-time forward delay value corresponding to the first service flow fragment as a delay compensation time for the first service flow fragment.

Optionally, the receiving module of the local device further includes a processing unit, and the processing unit is configured to: when receiving a re-initialization signal sent by the sending module of the peer device, return to perform the initialization.

Optionally, the receiving module of the local device further includes a first processing unit, and the first processing unit is configured to: when determining that a service channel status is abnormal, return to perform the initialization.

Optionally, the receiving module of the local device further includes a second processing unit, and the second processing unit is configured to: when determining that a quantity of times that a difference obtained by subtracting a real-time forward delay value of each service flow fragment from the forward delay threshold after the initialization ends exceeds a limit value within a first preset period reaches a first threshold, return to perform the initialization.

Optionally, the receiving module of the local device further includes a third processing unit, and the third processing unit is configured to: when determining that a quantity of times that a real-time forward delay value of each service flow fragment is less than a waiting time of the service flow fragment for entering a service cache unit within a second preset period reaches a second threshold, return to perform the initialization.

The receiving module of the local device shown in FIG. 7 can perform corresponding steps in the method of the foregoing embodiment. The receiving module of the peer device has a same structure as that of the receiving module of the local device, and details are not described herein again. When the initialization ends, the receiving module determines a delay threshold after the initialization ends and applies the delay threshold to delay compensation; and after a particular condition is met, re-triggers the initialization process. A dynamic compensation manner is ensured, and when a communications path changes or becomes abnormal, a compensation policy is automatically adjusted, thereby significantly reducing a bi-directional asymmetric delay variation and avoiding a problem of abnormal user communication that is caused when the variation exceeds a limit.

Figure 8:
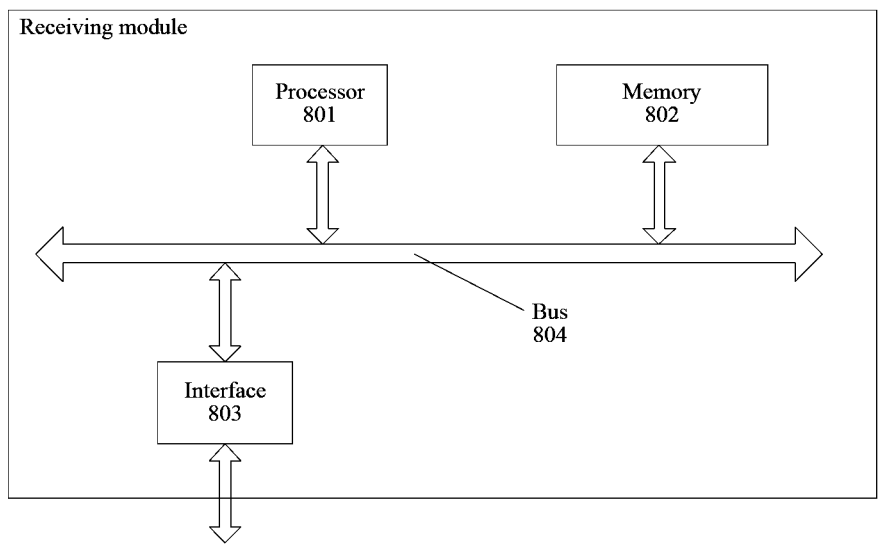
FIG. 8 is a schematic diagram of a hardware structure of a receiving module of a local device according to an embodiment of the present application.

FIG. 8 is a schematic diagram of a hardware structure of a receiving module of a local device according to an embodiment of the present application. The receiving module of the local device corresponding to FIG. 8 can perform corresponding steps in the method of the foregoing embodiment.

As shown in FIG. 8, the receiving module of the local device includes a processor 801, a memory 802, an interface 803, and a bus 804. The interface 803 may be implemented in a wired or wireless manner, and may be specifically an element such as a network adapter. The processor 801, the memory 802, and the interface 803 are connected by using the bus 804.

The memory 802 stores program code. Optionally, the program code may include an operating system program and an application program.

The processor 801 performs an initialization process.

The processor 801 clears a forward delay threshold and a reverse delay threshold when an initialization time starts.

The processor 801 determines a real-time forward delay value corresponding to a current service flow fragment, and the processor 801 receives, by using the interface 803, a reverse delay threshold that is corresponding to the current service flow fragment and is sent by a sending module of a peer device.

When determining that a maximum value between the real-time forward delay value corresponding to the current service flow fragment and the reverse delay threshold corresponding to the current service flow fragment is greater than a current value of the forward delay threshold, the processor 801 replaces the current value of the forward delay threshold with the maximum value.

When determining that the initialization time has not ended, the processor 801 returns to performing obtaining of a real-time forward delay value corresponding to a next service flow fragment and a reverse delay threshold corresponding to the next service flow fragment.

Optionally, the processor 801 determines that the forward delay threshold after the initialization ends is greater than a real-time forward delay value corresponding to a first service flow fragment, using a difference between the forward delay threshold after the initialization ends and the real-time forward delay value corresponding to the first service flow fragment as a delay compensation time for the first service flow fragment.

Optionally, when receiving a re-initialization signal sent by the sending module of the peer device, the processor 801 returns to performing the initialization.

Optionally, when determining that a service channel status is abnormal, the processor 801 returns to performing the initialization.

Optionally, when determining that a quantity of times that a difference obtained by subtracting a real-time forward delay value of each service flow fragment from the forward delay threshold after the initialization ends exceeds a limit value within a first preset period reaches a first threshold, the processor 801 returns to performing the initialization.

Optionally, the memory 802 includes a service cache unit, and when determining that a quantity of times that a real-time forward delay value of each service flow fragment is less than a waiting time of the service flow fragment for entering the service cache unit within a second preset period reaches a second threshold, the processor 801 returns to performing the initialization.

The receiving module of the local device shown in FIG. 8 can perform corresponding steps in the method of the foregoing embodiment. The receiving module of the peer device has a same structure as that of the receiving module of the local device, and details are not described herein again. When the initialization ends, the receiving module determines a delay threshold after the initialization ends and applies the delay threshold to delay compensation; and after a particular condition is met, re-triggers the initialization process. A dynamic compensation manner is ensured, and when a communications path changes or becomes abnormal, a compensation policy is automatically adjusted, thereby significantly reducing a bi-directional asymmetric delay variation and avoiding a problem of abnormal user communication that is caused when the variation exceeds a limit.

Figure 9:
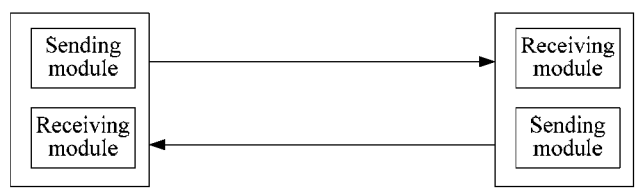
FIG. 9 is a schematic structural diagram of a communications system according to an embodiment of the present application.

FIG. 9 is a schematic structural diagram of a communications system according to an embodiment of the present application. The communications system provided by this embodiment of the present application may include a sending module of a peer device and the receiving module of the local device provided in the embodiment corresponding to FIG. 7 or FIG. 8, and details of the receiving module are not described herein again.

Optionally, the system further includes a forwarding module. The forwarding module is disposed on a link of a communications network between the sending module of the peer device and the receiving module of the local device, and the forwarding module is configured to forward a service frame.

A person of ordinary skill in the art may understand that, each aspect of the present application or a possible implementation manner of each aspect may be specifically implemented as a system, a method, or a computer program product. Therefore, each aspect of the present application or a possible implementation manner of each aspect may use forms of hardware only embodiments, software only embodiments (including firmware, resident software, and the like), or embodiments with a combination of software and hardware, which are uniformly referred to as "circuit", "module", or "system" herein. In addition, each aspect of the present application or the possible implementation manner of each aspect may take a form of a computer program product, where the computer program product refers to computer-readable program code stored in a computer-readable medium.

The computer-readable medium may be a computer-readable signal medium or a computer-readable storage medium. The computer-readable storage medium includes but is not limited to an electronic, magnetic, optical, electromagnetic, infrared, or semi-conductive system, device, or apparatus, or any appropriate combination thereof, such as a random access memory (full spelling in English: Random access memory, RAM for short), a read-only memory (full spelling in English: Read-only memory, ROM for short), an erasable programmable read only memory (full spelling in English: EPROM or flash memory for short), an optical fiber, and a compact disc read only memory (full spelling in English: Compact disc read-only memory, CD-ROM for short).

A processor in a computer reads computer-readable program code stored in a computer-readable medium, so that the processor can perform a function and an action specified in each step or a combination of steps in a flowchart; an apparatus is generated to implement a function and an action specified in each block or a combination of blocks in a block diagram.

All computer-readable program code may be executed on a local computer of a user, or some may be executed on a local computer of a user as a standalone software package, or some may be executed on a local computer of a user while some is executed on a remote computer, or all the code may be executed on a remote computer or a server. It should also be noted that, in some alternative implementation solutions, each step in the flowcharts or functions specified in each block in the block diagrams may not occur in the illustrated order. For example, two consecutive steps or two blocks in the illustration, which are dependent on an involved function, may in fact be executed substantially at the same time, or these blocks may sometimes be executed in reverse order.

Obviously, a person skilled in the art can make various modifications and variations to the present application without departing from the spirit and scope of the present application. The present application is intended to cover these modifications and variations provided that they fall within the scope of protection defined by the following claims and their equivalent technologies.

What is claimed is:

1. A compensation method, wherein the compensation method is applied after an initialization ends, and the compensation method comprises:
   when determining that a forward delay threshold after the initialization ends is greater than a real-time forward delay value corresponding to a first service flow fragment, using, by a local device, a difference between the forward delay threshold after the initialization ends and the real-time forward delay value corresponding to the first service flow fragment as a delay compensation time for the first service flow fragment;
   wherein the initialization comprises:
   setting, by the local device, a value of the forward delay threshold to zero and setting, by the local device, a value of a reverse delay threshold to zero when an initialization time starts;
   determining, by the local device, a real-time forward delay value corresponding to a current service flow fragment, and receiving a reverse delay threshold corresponding to the current service flow fragment and is sent by a peer device;
   when determining that a maximum value between the real-time forward delay value corresponding to the current service flow fragment and the reverse delay threshold corresponding to the current service flow fragment is greater than a current value of the forward delay threshold, replacing, by the local device, the current value of the forward delay threshold with the maximum value; and
   when determining that the initialization time has not ended, returning, by the local device, to perform a step of obtaining a real-time forward delay value corresponding to a next service flow fragment and a reverse delay threshold corresponding to the next service flow fragment.

2. The compensation method according to claim 1, wherein the compensation method further comprises:
   when receiving a re-initialization signal sent by the peer device, returning, by the local device, to perform the initialization.

3. The compensation method according to claim 1, wherein the compensation method further comprises:
   when determining that a service channel status is abnormal, returning, by the local device, to perform the initialization.

4. The compensation method according to claim 1, wherein the compensation method further comprises:
   when determining that a quantity of times that a difference obtained by subtracting a real-time forward delay value of each service flow fragment from the forward delay threshold after the initialization ends exceeds a limit value within a first preset period reaches a first threshold, returning, by the local device, to perform the initialization.

5. The compensation method according to claim 1, wherein
   when determining that a quantity of times that a real-time forward delay value of each service flow fragment is less than a waiting time of the service flow fragment for entering a service cache unit within a second preset period reaches a second threshold, the local device returns to perform the initialization.

6. The compensation method according to claim 1, wherein the local device is a packet transport network (PTN) device.

7. The compensation method according to claim 1, wherein the local device is an optical transport network (OTN) device.

8. A local device, wherein the local device comprises:
   a processor; and
   a memory storing instructions;
   wherein the processor is configured to execute the instructions to implement a method comprising:
   setting a value of a forward delay threshold to zero and setting a value of a reverse delay threshold to zero when an initialization time starts;
   determining a real-time forward delay value corresponding to a current service flow fragment and receiving a reverse delay threshold corresponding to the current service flow fragment and is sent by a peer device;
   when determining that a maximum value between the real-time forward delay value corresponding to the current service flow fragment and the reverse delay threshold corresponding to the current service flow fragment is greater than a current value of the forward delay threshold, replacing the current value of the forward delay threshold with the maximum value; and
   when determining that the initialization time has not ended, returning to perform a step of obtaining a real-time forward delay value corresponding to a next service flow fragment and a reverse delay threshold corresponding to the next service flow fragment.

9. The local device according to claim 8, wherein the processor is configured to execute the instructions to implement a method further comprising: when determining that the forward delay threshold after the initialization ends is greater than a real-time forward delay value corresponding to a first service flow fragment, using a difference between the forward delay threshold after the initialization ends and the real-time forward delay value corresponding to the first service flow fragment as a delay compensation time for the first service flow fragment.

10. The local device according to claim 9, wherein the processor is configured to execute the instructions to implement a method further comprising: when receiving a re-initialization signal sent by the peer device, returning to perform the initialization.

11. The local device according to claim 9, wherein the processor is configured to execute the instructions to implement a method further comprising: when determining that a service channel status is abnormal, returning to perform the initialization.

12. The local device according to claim 9, wherein the processor is configured to execute the instructions to implement a method further comprising: when determining that a quantity of times that a difference obtained by subtracting a real-time forward delay value of each service flow fragment from the forward delay threshold after the initialization ends exceeds a limit value within a first preset period reaches a first threshold, returning to perform the initialization.

13. The local device according to claim 9, wherein the processor is configured to execute the instructions to implement a method further comprising: when determining that a quantity of times that a real-time forward delay value of each service flow fragment is less than a waiting time of the service flow fragment for entering a service cache unit within a second preset period reaches a second threshold, returning to perform the initialization.

14. The local device according to claim 8, wherein the local device is a packet transport network (PTN) device.

15. The local device according to claim 8, wherein the local device is an optical transport network (OTN) device.

\* \* \* \* \*